Feb. 2, 1965
J. E. FLEMING ETAL
3,168,348
WHEEL COOLING MEANS
Filed Oct. 30, 1962
2 Sheets-Sheet 1
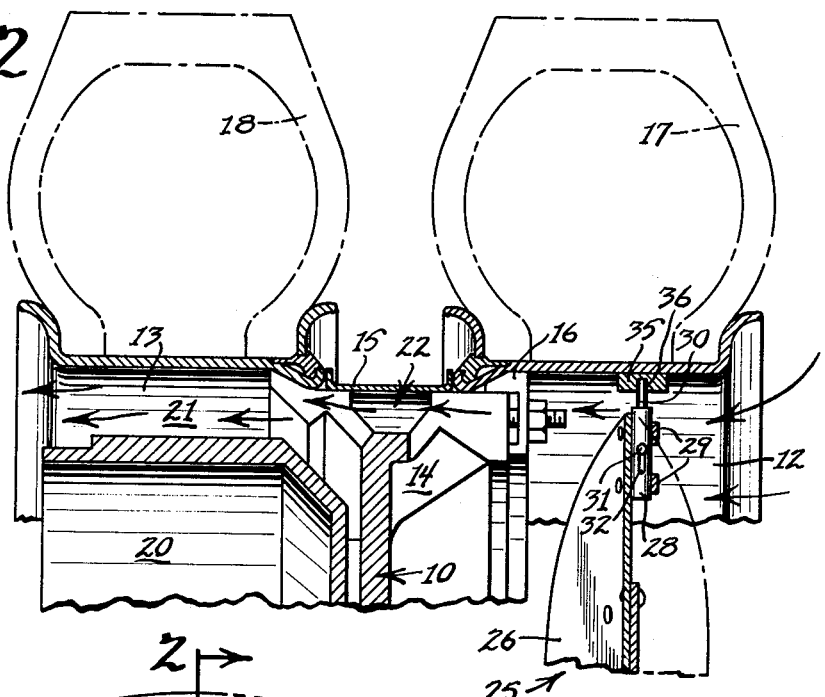
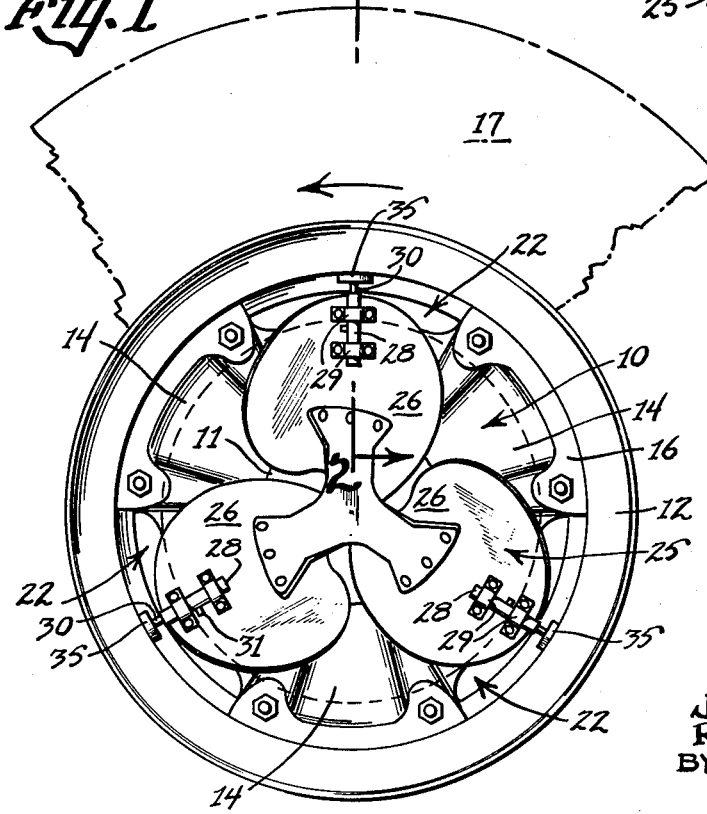
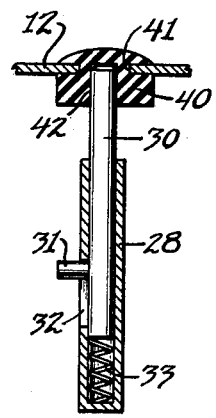
INVENTORS:
JAMES E. FLEMING &
ROY L. MATLOCK
BY Harrington A Lackey
ATTORNEY INVENTORS:
JAMES E. FLEMING &
ROY L. MATLOCK
BY Harrington A. Lackey
ATTORNEY

# United States Patent Office 3,168,348
Patented Feb. 2, 1965

3,168,348
WHEEL COOLING MEANS
James E. Fleming and Roy L. Matlock, both % Matlock & Cope Truck Body Manufacturing Corp., 151 Fairfield, Nashville 3, Tenn.
Filed Oct. 30, 1962, Ser. No. 234,088
2 Claims. (Cl. 301—6)

This invention relates to means for cooling vehicle wheels, and more particularly to fan means attached to a vehicle wheel for cooling the same.

Rolling wheels on moving vehicles, and particularly heavy vehicles such as trucks and trailers, generate considerable and sometimes excessive heat. This heat develops from friction in the bearings, the continual flexing of the ground-engaging portions of the tires, and friction in the application of the brakes. Moreover, this mechanically developed heat is supplemented by the radiation from the sun and the hot pavement on hot days. As a matter of fact, some trucks and trailers on long hauls across desert areas of the western United States in the summertime have been known to catch afire, resulting in the complete destruction of the vehicle and its contents.

It is well known that excessive heat either developed in the tires or transferred to them from the bearings and brake drums have a deleterious effect upon the tires, causing them to depreciate quite rapidly.

Another heat problem develops in the continuous application of the brakes, particularly in driving down steep grades. If the vehicle is stopped immediately after such a drive and the brakes are set while the brake drums are hot and therefore expanded, the cooling drum will try to shrink, but instead will fracture and split.

It is therefore an object of this invention to provide improved means for cooling wheels, and particularly wheels on heavy vehicles, in order to overcome the above problems.

Another object of this invention is to provide means for cooling vehicle wheels by drawing air through the wheels in amounts depending on the speed of rotation of the wheel.

Another object of this invention is to provide novel fan means for incorporation in the structure of a vehicle wheel, which requires no power except the rotation of the wheel for drawing air therethrough.

Another object of this invention is to provide a novel fan means in the spacer between adjacent tire rims in a dual-wheel construction.

Another object of this invention is to provide a novel combination cooling means for drawing air not only through the wheel and across the brake drum, but also between the tires in a dual-wheel construction.

Further objects and advantages of the invention will be apparent from the following description taken in conjunction with the drawings, wherein:

FIG. 1 is a side elevation of one form of the invention mounted on a vehicle wheel having a dual-wheel construction;

FIG. 2 is a section taken along the line 2—2 of FIG. 1;

FIG. 3 is an enlarged fragmentary sectional elevation disclosing a modified means for attaching the cooling means of FIG. 1 to the rim of the wheel;

Figure 4:
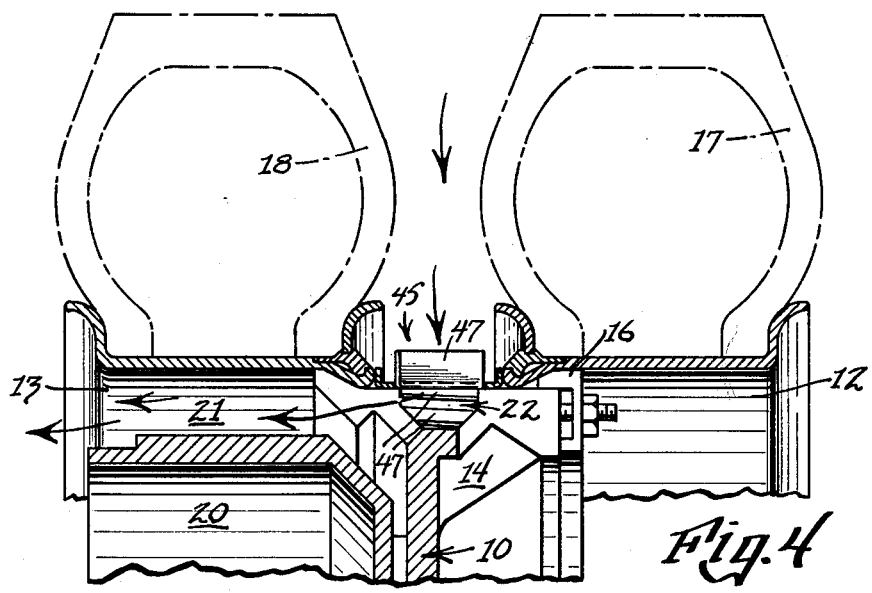
FIG. 4 is a section similar to FIG. 2, disclosing a novel cooling means incorporated in the rim spacer.

Referring now more particularly to the drawings, FIGS. 1 and 2 disclose a vehicle wheel 10 having a hub 11, an outboard rim 12, an inboard rim 13 and spokes 14. An annular spacer 15 is mounted on the periphery of the spokes 14 and separates the rims 12 and 13. Rim clamp 16 holds the outboard rim 12 in abutment against the edge of the rim spacer 15. Each of the rims 12 and 13 supports a pneumatic tire 17 and 18, respectively. Also, concentrically mounted on the inside of the wheel 10 within the inboard rim 13 is a conventional brake drum 20 providing an annular space 21. The parts thus far described are conventional for a dual-wheel construction, particularly in large vehicles such as trucks and tractor-trailers.

The conventional wheel 10, described above, is provided with no means for cooling the wheel 10, the tires 17 and 18 or the drum 20, except any air which might incidentally flow between the tires 17 and 18 above the rim 15, or any air which might pass through the openings 22 between the spokes 14.

In order to draw air from the outboard side of the wheel 10, through the rim 12, the openings 22 and the annular space 21, and to exhaust the air on the inboard side of the wheel 10, a fan 25 is mounted on the wheel 10 co-axially of the hub 11 for rotation therewith. The fan 25 preferably comprises any desired number of blades, such as the three blades 26 disclosed in FIG. 1. The outer diameter of the fan 25 is preferably slightly less than the inner diameter of the outboard rim 12 in order that the rim 12 may provide a well within which the fan 25 may be received so that no part of the fan 25 will extend beyond the outboard edge of the rim 12. The location of the fan 25 within the outboard rim 12 is not only for safety reasons, but also to increase the efficiency of the fan 25 by directing all of the air flow axially of the fan 25. It will be noted that the pitch of the blades is such as to direct the air flow inboard when the wheel 10 is rotating in the direction of the arrow disclosed in FIG. 1.

A preferred form of mounting the fan 25 co-axially of the hub 11 is disclosed in FIGS. 1–3. Mounted on the outer edge of each blade 26 is a cylinder 28 having an inner closed end and an outer open end with its axis radially aligned with the corresponding blade 26. Each cylinder 28 may be fixed to its corresponding blade 26 by means of the bracket 29. A cylindrical plunger or latch 30 is telescopingly received for slidable movement within the cylinder 28, and is provided with a handle 31 extending through an elongated slot 32 in the cylinder 28 for manually sliding the plunger 30 for a limited distance within the cylinder 28. A spring 33 is seated between the closed end of the cylinder 28 and the inner end of the plunger 30 in order to bias the plunger 30 radially outward. Since the fan 25 includes three blades 26 uniformly circumferentially spaced, the cylinders 28 are likewise uniformly spaced at angles of 120°. Also, secured, such as by welding, at 120° intervals around the inner surface of the outboard rim 12 are blocks 35 (FIGS. 1 and 2), made of any suitable material such as metal, equal in number to the number of plungers 30. Each block 35 contains a recess or socket 36 to receive the outer end of the corresponding plunger 30 in locked position.

FIG. 3 discloses a modified plunger-receiving means in the form of an annular grommet 40 having an annular slot 41. The grommet 40 is secured to the rim 12, preferably by forming a small hole within the rim 12 and inserting the larger grommet 40 therethrough until the hole engages the slot 41. A circular recess or socket 42 is formed in the inner surface of the grommet 40 for receiving the outer end of the plunger 30 in its normal locked position when biased by the spring 33. When it is desired to release the plunger 30 from the recess 37, the handle 31 is moved radially inward to retract the plunger 30 until it is completely disengaged from the grommet 40.

In this manner, the fan 25 may be easily and securely attached and just as easily detached from any type of vehicle wheel having a laterally extending rim. For an existing tire rim, it is only necessary to punch the desired number of holes at properly spaced intervals through the rim for receiving the grommets 40.

Of course, it is possible to mount the fan 25 by a specially designed bracket to the hub 11 of the wheel, but since the designs of vehicle wheels and their hubs vary, it might require several different designs of hub brackets to accommodate the fan 25 to the differently designed wheels.

Figure 5:
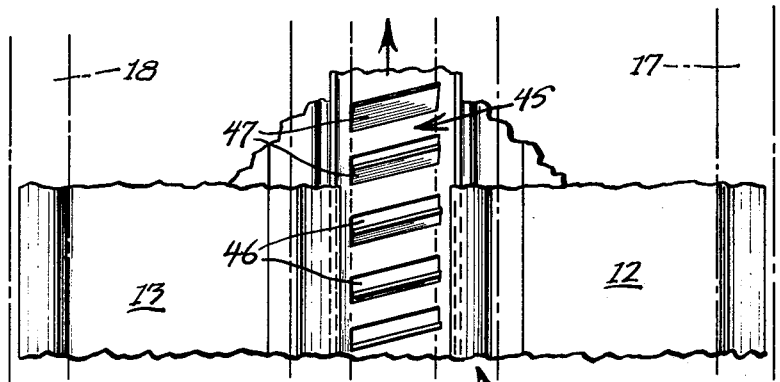
FIG. 5 is a fragmentary top plan view of the device closed in FIG. 4.
Figure 6:
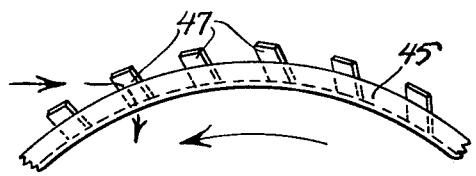
FIG. 6 is a fragmentary side elevation of the rim spacer of FIGS. 4 and 5.

With reference now to FIGS. 4–6, the same wheel construction 10–22 of FIG. 2 is disclosed in FIG. 4, with the exception that the conventional rim spacer 15 has been replaced by the rim spacer 45 of novel construction. Spacer 45 is also annular and abuts the adjacent edges of the outboard rim 12 and the inboard rim 13 in order to separate them, and the spacer 45 is also mounted on the outer periphery of the spokes 14. However, the rim spacer 45 is provided with a plurality of uniform transverse slots 46, preferably equally spaced circumferentially of the spacer 45. Each slot 46 has the shape of a parallelogram. Assuming the wheel 10 rotates in the direction of the arrows in FIGS. 5 and 6, the front or leading edge and the rear or trailing edge of each slot 46, slant rearwardly and inboard of the wheel 10. Affixed to the trailing edge of each slot 46 and slanting radially outwardly and forwardly therefrom is a blade or vane 47. Each vane 47 has substantially the same configuration as its corresponding slot and may be formed by striking out a corresponding portion from the spacer 45.

As the spacer 45 rotates in the direction of the arrows disclosed in FIGS 5 and 6, air between the tires 17 and 18 will be caught by the blades 47 and forced radially inwardly through the slots 46 and inboard through the annular space 21 in order to cool the inboard rim 13 and the brake drum 20. By pulling the air radially inwardly, a draft will be set up between the tires 17 and 18 to cool their adjacent side walls. Moreover, some air will be drawn from the outboard side of the wheel 10 through the openings 22 into the annular space 21. Thus, it is important that the radial vane 47 extend radially outwardly of the rim spacer 45.

If desired, the fan 25 disclosed in FIGS. 1 and 2 may be combined with the novel rim spacer 45 disclosed in FIGS. 4–6, to draw air between the tires 17 and 18 and also from the outboard side of the wheel 10 completely through both rims 12 and 13. The forced air from both fan cooling means 25 and 45 will reinforce each other through the annular space 21 in order to more effectively cool the brake drum 20 and the inboard rim 13.

Thus, both cooling means 25 and 45 employ fan blades stationary fixed co-axially of a vehicle wheel, and may be used either individually or in combination with each other, and without any external power means for effectively cooling the overheated parts of a conventional vehicle wheel. The fan 25 may be used on a single or a dual-wheel construction. Moreover, the fan 25 may be easily attached and detached to any type of vehicle wheel having a rim extending laterally beyond its hub. Moreover, the fan 25 utilizes the laterally extending rim 12 to improve its air-drawing efficiency and safety.

The novel rim spacer 45 incorporating the slots 46 and blades 47 may be easily substituted for the conventional type rim spacer in a dual-wheel construction. Although the rim spacer 45 will draw air through the outboard rim 12, it is primarily designed for drawing air between the tires 17 and 18 and across the brake drum 20 in order to quickly cool these parts, which are easily damaged by excessive heat.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed:

1. In a dual wheel having an inboard rim and an outboard rim spaced axially of each other and a brake drum mounted within and radially spaced from said inboard rim, wheel cooling means comprising:
   (a) an annular cylindrical spacer having a radius greater than the radius of said brake drum but not greater than the radius of said inboard rim,
   (b) said spacer being mounted between and in abutting relation with said rims to separate rims,
   (c) said spacer having circumferentially spaced slots therethrough, each slot having a leading edge, a trailing edge, an inboard edge and an outboard edge,
   (d) a deflector blade affixed to the trailing edge of each slot and extending radially outwardly of said spacer and inclined toward the leading edge of its corresponding slot,
   (e) each blade also being inclined to the rotational axis of said spacer so that the inboard edge of the blade trails its outboard edge in order to direct air from outside said spacer through said corresponding slot and inboard between said brake drum and said inboard rim when said wheel is rotated in the direction of said leading edges.

2. The invention according to claim 1 in which each of said slots has a parallelogram shape.

References Cited by the Examiner

UNITED STATES PATENTS

| | | |
|---|---|---|
| 2,022,153 | 11/35 | Rogers. |
| 2,039,554 | 5/36 | Rogers _____ 301—1 X |
| 2,049,566 | 8/36 | Knapp _____ 301—108 |
| 2,587,167 | 2/52 | Kelly _____ 292—175 X |
| 2,857,023 | 10/58 | Lyon _____ 301—6 X |
| 2,945,567 | 7/60 | Lyon _____ 301—37 X |
| 3,028,072 | 4/62 | Atalla _____ 230—241 |

ARTHUR L. LA POINT, *Primary Examiner.*

RICHARD C. RIORDON, *Examiner.*